Figure 1:
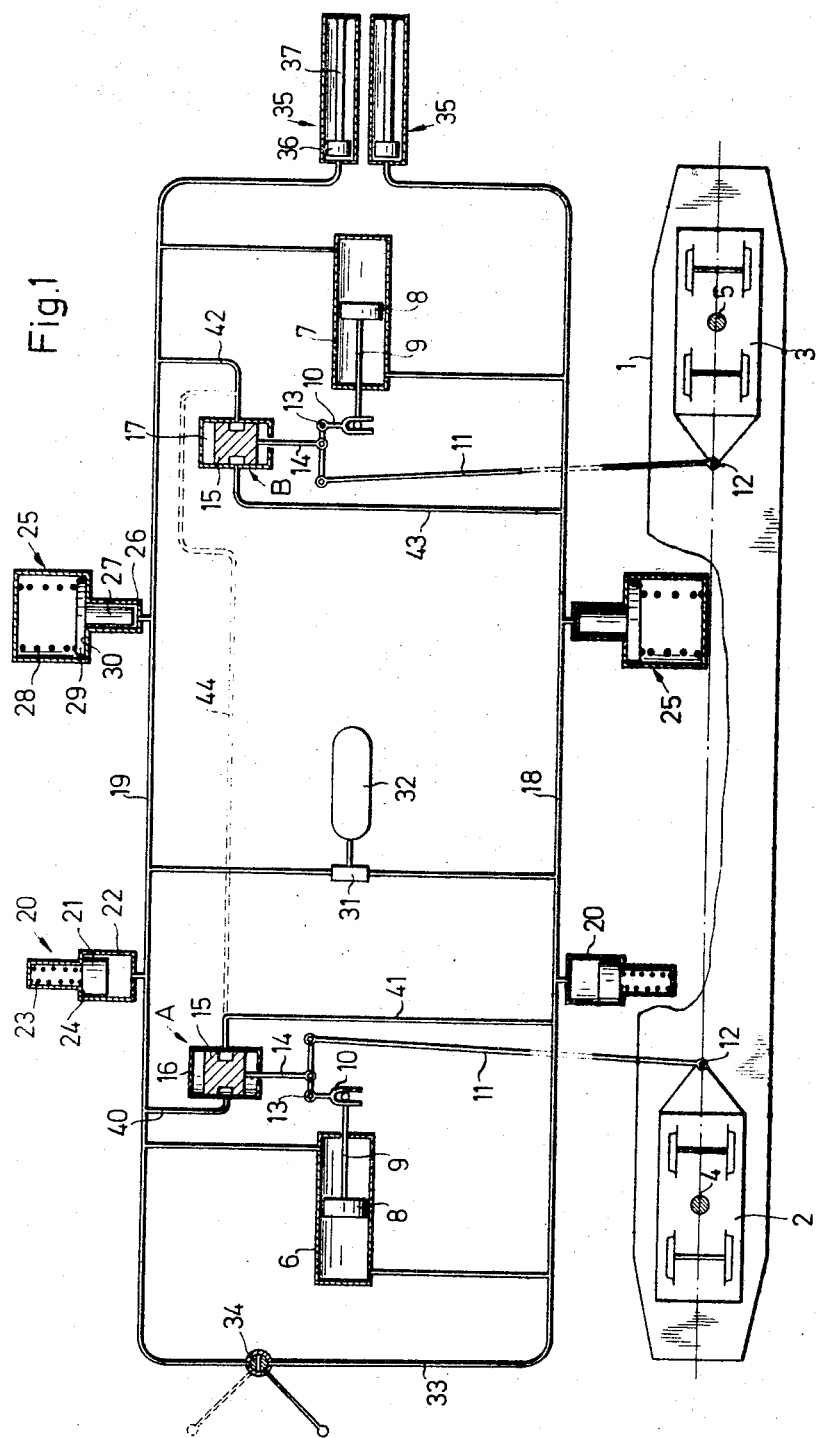

United States Patent [19]

Hinnen et al.

[11] 3,854,420
[45] Dec. 17, 1974

[54] CROSS-COUPLING FOR THE TRUCKS OF A RAILROAD VEHICLE

[75] Inventors: Hermann Hinnen, Sulz/Attikon; Gaston Borgeaud, Winterthur, both of Switzerland

[73] Assignee: Schweizerische Lokomotiv-und Maschinenfabrik, Winterthur, Switzerland

[22] Filed: June 27, 1973

[21] Appl. No.: 373,913

[30] Foreign Application Priority Data
July 7, 1972   Switzerland......................... 10267/72

[52] U.S. Cl............................... 105/176, 105/177
[51] Int. Cl............................................ B61d 1/00
[58] Field of Search..................... 105/168, 176, 177

[56] References Cited
UNITED STATES PATENTS

| | | |
|---|---|---|
| 3,417,711 | 12/1968 | Lich................................ 105/176 X |
| 3,528,374 | 9/1970 | Wickens.......................... 105/176 X |
| 3,719,153 | 3/1973 | Schumacher.................... 105/168 X |
| 3,728,973 | 4/1973 | Hinnen............................ 105/176 |

Primary Examiner—M. Henson Wood, Jr.
Assistant Examiner—John J. Love
Attorney, Agent, or Firm—Kenyon & Kenyon Reilly Carr & Chapin

[57] ABSTRACT

The trucks are interconnected by a hydraulic coupling system which is actuated during travel of the vehicle along a curved section of track so that a deviation of one truck from the longitudinal axis of the vehicle causes an opposite deviation of the other truck. The deviation of the trucks are such that the imaginary prolonged centerlines of the trucks intersect at a point as close as possible to the mid-point between the trucks. This decreases the lateral forces on the wheel rims.

16 Claims, 3 Drawing Figures

CROSS-COUPLING FOR THE TRUCKS OF A RAILROAD VEHICLE

This invention relates to a cross-coupling for the trucks of a railroad vehicle.

Heretofore, in the case of railroad vehicles having trucks, it has been known to couple the inner ends of the trucks together by means of a rod system in such a manner that as one truck pivots in one direction relative to the vehicle frame, the other truck is positively pivoted in the opposite direction. This is intended to have the imaginary prolonged centerlines of the trucks intersect at a point as near as possible to the mid-point between the trucks. In this way, when the vehicle travels along a curved section of track, there would be a decrease of the lateral forces acting on the wheel rims.

However, in the case of long vehicles having a relatively large spacing between the trucks, the known mechanical forms of construction of the cross-couplings have been of increased complexity as well as of increased weight as the distance between the truck increases. These mechanical systems, moreover, suffer the disadvantage of being exceeding elastic in the case of vehicles of great length unless their construction is excessively massive.

Accordingly, it is an object of the invention to provide a cross-coupling for a railroad vehicle which is substantially non-elastic.

It is another object of the invention to provide a cross-coupling system which is particularly suited to long railroad vehicles.

It is another object of the invention to provide a cross-coupling system which is simple to construct.

Briefly, the invention provides a rail vehicle frame having at least two pivotally mounted trucks with a cross-coupling including a pair of hydraulic cylinder means each of which is connected to a respective truck for pivoting the truck and a pair of connecting conduits hydraulically connected between the cylinder means for synchronizing the cylinder means to pivot the trucks in opposite directions in response to pivoting of at least one of the trucks.

In the case of a vehicle having two trucks, one at each end, the cross-coupling hydraulic cylinder means are mounted on the vehicle frame. In the case a vehicle has three trucks, the hydraulic cylinder means for the two outer trucks may be mounted on the middle truck. In this way, piloting of the third truck can be obtained without complicating the system.

Each cylinder means preferably uses a double-acting hydraulic cylinder with a piston dividing the cylinder into two chambers and with the chambers connected to the connecting conduits. This allows a simple construction of the coupling, with which moreover, because of a single emerging piston-rod from each cylinder, there is a minimum risk of loss of the hydraulic medium through leaks.

The cross-coupling further includes an equalizing line which connects the connecting lines together, and which includes a hydraulic control valve that can be actuated when the turning movement of a truck exceeds a certain angle. In this way, when travelling in a straight line, connection of the two connecting lines by the equalizing line is allowed but upon entering a curve of the track is interrupted. Thus, the operation of the cross-coupling can be limited to cases where actually needed, namely in curves. In straight stretches of track on the other hand, the trucks are free to turn and adapt themselves to the track. At the same time, there is also an equalization of the pressure between the two connecting lines. The hydraulic control valve may be in the form of a control slide which can be operated by a turning movement of the truck.

When the railroad vehicle has two trucks, with a control valve connected with each truck, then, in principle, only two hookups are possible. Thus, the control valves of the two trucks can either be connected in parallel or in series to the connection lines. In this way, different effects are obtained. When the control valves are connected together in parallel, an interruption of the connection occurs only when the two trucks are situated in a curve, i.e. on curved rails, and both are deviated out of their position parallel to the vehicle axis. When, on the other hand, the two control valves are connected in series between the connecting lines, then an interruption occurs as soon as the entry of the first truck into the curve.

In the case of a railroad vehicle having two trucks, it is possible to provide a control valve that is coupled to the two trucks. During a deviation of one of the trucks from a symmetrical angular position relative to the transverse axis of the vehicle, this control valve serves to release a supply of hydraulic pressure-medium from a source of pressure-medium into one of the connecting lines, with a simultaneous opening of an outflow out of the other connecting line. In this way, a correction of the angular setting of the trucks toward a symmetrical setting can be obtained. The coupling thus has a control which ensures perfect functioning of the coupling at all times by influencing the supply of hydraulic medium.

The control valve may preferably be a control slide with a housing connected with one truck, and a slide element connected over a linkage with the other truck. The source of the medium under pressure may moreover preferably comprise a pressure-storage tank. This ensures a reverse supply of hydraulic pressure-medium at all times.

With one particularly advantageous form of construction, at least one of the trucks may be associated with a hydraulic piston-pump which pumps the hydraulic pressure-medium into the pressure-storage tank, in such a way that turning movements of the truck results in strokes of the pump piston. This gives a form of construction with which the pressure-storage tank is kept under pressure by a simple means during operation.

It is also possible to connect the pump to the hydraulic cylinder means, by securing the pump piston to the piston-rod of the cylinder means. In this way, the arrangement, together with the piston-pump, can be greatly simplified.

It is also possible to connect the pump to the hydraulic cylinder means, by securing the pump piston to the piston rod of the cylinder means. In this way, the arrangement, together with the piston-pump, can be greatly simplified.

It is also possible to connect the two connecting lines together by means of a controlled short-circuit line. In this way, the cross-coupling can be made inoperative by opening the short-circuit line when desired. The movement of one of the trucks is then no longer transmitted to the second truck.

Preferably, an elastic pressure-maintaining means is connected to each connecting line to prevent a drop of the pressure below a certain minimum value. This prevents damage that might occur through under-pressure.

On the other hand, each connecting line may be connected to a pressure-limiting means for limiting the maximum pressure in the line. Through such a measure, damage to the coupling through too great a pressure is avoided.

Furthermore, the connecting lines may be connected to a common replenishing means in a pressure-storage means. In this way, it is possible to prolong the time gaps between servicings of the cross-coupling, since any loss of hydraulic medium that may occur is made good by automatic replenishment.

Finally, it is also possible to connect thermal equalizing elements to the connecting lines to prevent pressure variations of the hydraulic pressure medium caused by changes of temperature. This ensures reliable functioning of the cross-coupling even with great fluctuations of the temperature.

Figure 2:
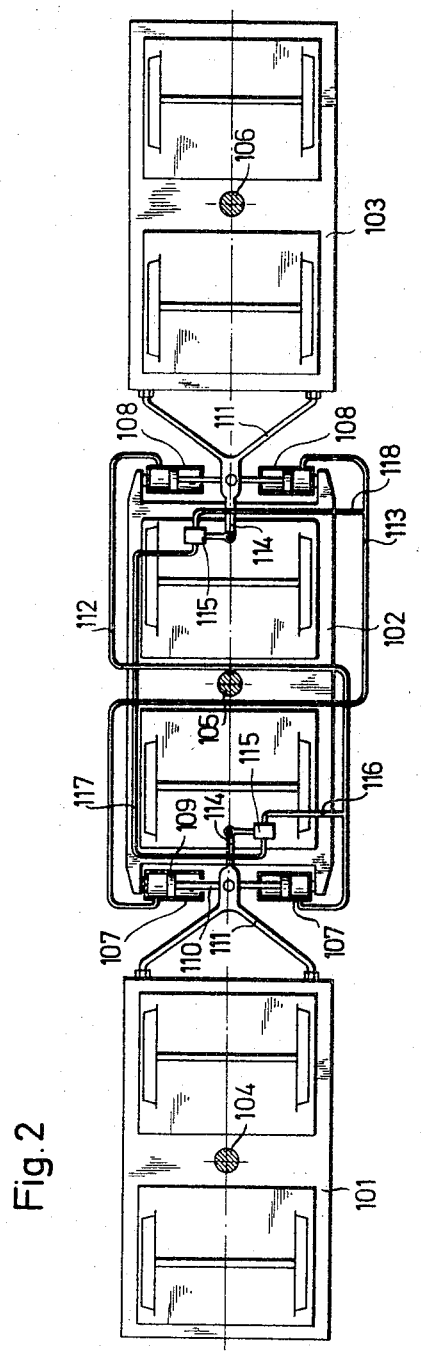

These and other objects and advantages of the invention will become more apparent from the following detailed description and appended claims taken in conjunction with the accompanying drawings in which:

FIG. 1 diagrammatically illustrates a railroad vehicle having two trucks connected by a cross-coupling according to the invention;

FIG. 2 diagrammatically illustrates a vehicle with three trucks; and

Figure 3:
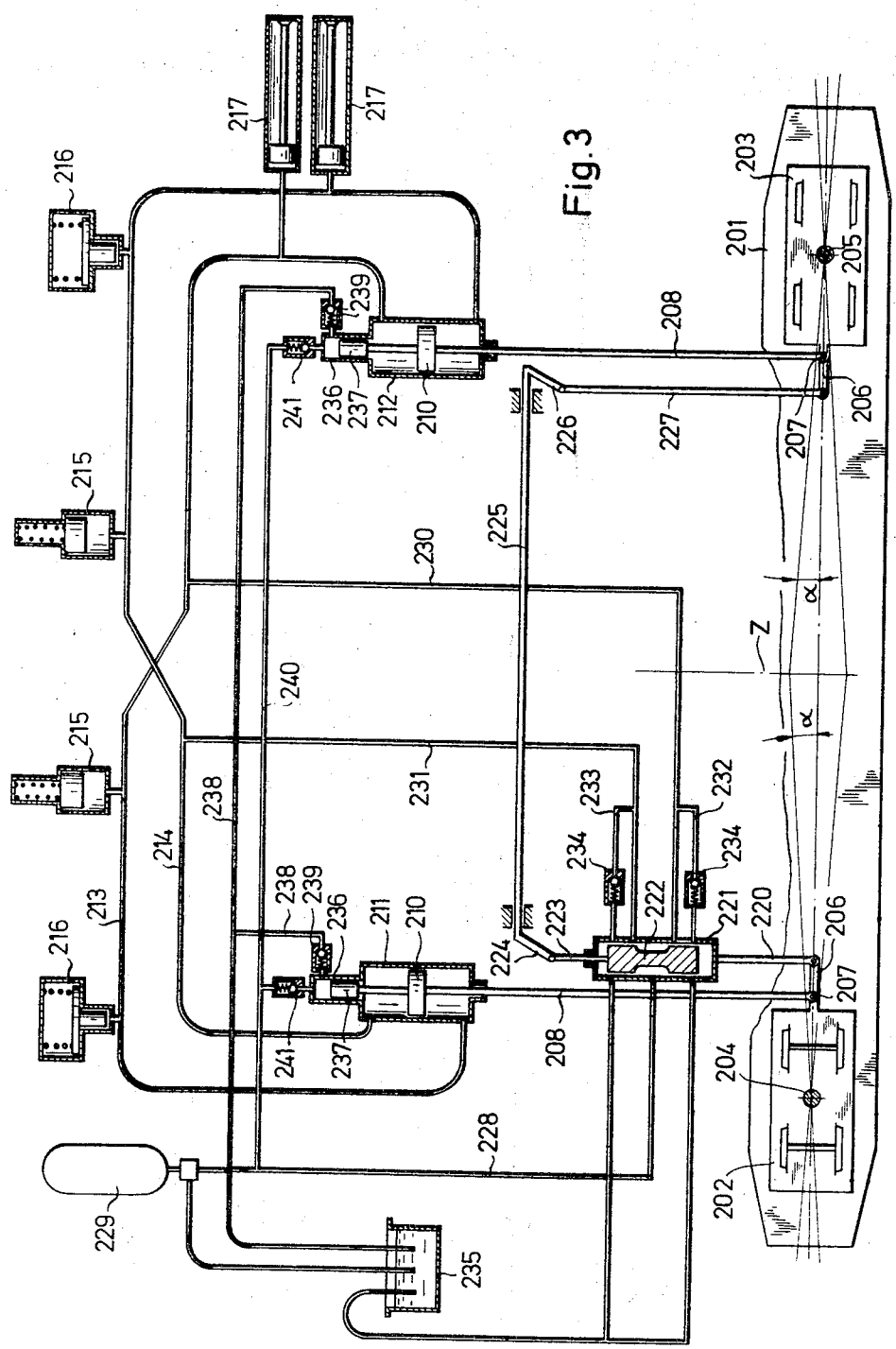

FIG. 3 diagrammatically illustrates a modified construction of a railroad vehicle having two trucks.

Referring to FIG. 1, a railroad vehicle has a vehicle frame 1 that is mounted on two trucks or bogies 2, 3. The trucks 2, 3 are pivotable relative to the frame 1 in pivots 4, 5 so as to pivot about vertical axes. These trucks 2, 3 are connected to each other by a cross-coupling. For the sake of clarity, the parts of the cross-coupling are shown above the frame 1, although they are located in the frame itself.

The cross-coupling comprises two hydraulic cylinder means each of which is associated with one of the trucks 2, 3. Each cylinder means includes a double-acting cylinder 6, 7 in which a piston 8 is slidably mounted to divide the cylinder 6, 7 into two chambers. The pistons 8 have piston rods 9 connected via angle-levers 10, with rods 11 which act on journals 12 of the trucks 2, 3, respectively. The angle-levers 10 are able to pivot about pivots 13, which are disposed in a fixed position in the frame 1. In addition, the arm of each angle-lever 10 is connected to a piston rod 14 of a slide-piston 15, which is able to move in a slide-cylinder 16, 17, respectively.

The cylinder chambers of the associated hydraulic cylinders 6, 7 are connected with one another by connecting lines 18, 19 and in such a way that a movement of the piston 8 in the cylinder 6 to the right produces a motion to the left of equal magnitude in the other cylinder 7 and vice versa. A turning movement of one of the trucks in one direction of turn in this way produces a turning movement of the other truck in the opposite direction of turn.

The two connecting lines 18, 19 are each provided with a pressure-maintaining means 20 in order to prevent a dropping of the pressure below a given minimum value. For this purpose, the means 20 comprises a piston 21 which is slidably mounted in a cylinder 22 and is loaded by a suitably dimensioned spring 23. The piston 21 normally bears against a stop-surface 24 of the cylinder 22. However, as soon as the pressure in the cylinder 22, and thus in the associated line 18, 19, drops below the minimum value, the spring 23 lifts the piston 21 away from the stop 24, so that a further drop of pressure is prevented.

In addition, each connecting line 18, 19 is provided with a pressure-limiting means 25 for limiting the maximum pressure. This pressure-limiting means comprises a cylinder 26 in which a piston 27 is slidably mounted and loaded by a prestressed spring 28. In normal operation, the spring 28 presses a larger-diameter part 29 of the piston 27 against a stop-surface 30 of the cylinder 26. However, as soon as the pressure in the cylinder 26 exceeds the specified maximum value, the force of the spring 28 is overcome, and the piston 27 moves in the cylinder 26. Due to the increase of volume thus produced, a further rise of pressure is mitigated.

Furthermore, the two connecting lines 18, 19 are connected by a replenishment means 31 with a hydraulic storage tank 32. The replenishing means, which may be made in a known manner and which forms no part of the invention, serves to replenish the hydraulic medium in the lines 18, 19 to make good for any losses.

As shown by FIG. 1, the two connecting lines 18, 19 are connected by a short-circuit line 33 with a control valve 34. In the illustrated position, the valve 34 interrupts the connection of the lines 18, 19 so that a movement of the one piston 8 results in a corresponding suitable movement of the other piston 8. When the valve 34 is set in the dotted-line position the short-circuit line is opened. Then, the opposite connection of the pistons 8 becomes interrupted, and the cross-coupling is switched out.

As shown at the right-hand end of FIG. 1, a temperature compensating means in the form of thermal equalizing cylinders 35 are connected to the lines 18, 19. These cylinders 35 are in known manner provided with pistons 36 mounted on piston-rods 37 which have such a coefficient of expansion relative to the cylinders and the hydraulic medium that a rise or fall of pressure in the lines 18, 19 through temperature influences becomes compensated.

Control valves A, B each composed of a cylinder 16, 17, and a slide-piston 15 are connected in parallel between the lines 18, 19. For this purpose, the control valves are disposed in equalizing lines 40, 41 and 42, 43, respectively. With this arrangement, the cross-coupling becomes operational only when both valves A, B have interrupted the connection of the lines 18, 19. It is also possible to use the hook-up shown by dotted lines in FIG. 1, according to which both valves A, B are connected one after the other, in series that is, by an equalizing line 44. It is understood that, in this case, the lines 41, 42 do not exist.

When the valves A, B are set in series, even a movement of one of the valves out of the illustrated position suffices to interrupt the connection of the lines 18, 19 with one another, and to make the cross-coupling operative.

During operation of the vehicle, with the valves A, B set in parallel as shown by the solid lines of FIG. 1, the cross-coupling become operative only when the two trucks are situated in a curve, that is, upon rails bent with a radius. In the case of a series connection having the equalizing line 44, the cross-coupling becomes operative when the first truck is, in the direction of travel, upon the bent rails but while the second truck is still on the straight rails.

Each of these forms of construction has its own advantages, so that a decision between them has to be made as to which should be used in a particular case.

Referring to FIG. 2, a railroad vehicle has three trucks 101, 102 and 103 which are able to pivot about journals 104, 105 and 106. At the same time, as is known, a certain lateral movement of the trucks relative to a vehicle frame (not shown) is possible. In this case, the vehicle frame is not shown, because all the hydraulic parts of the cross-coupling are disposed on the middle truck 102.

The middle truck 102 is provided with two pairs of cylinders 107, 108, in which pistons 109 are able to move with piston-rods 110 acting on arms 111 of the end trucks 101, 103 respectively. The cylinder chambers of the cylinders 107 and 108, which in this case are single-acting cylinders, are connected with one another in such a way that the turning of one of the trucks relative to the longitudinal axis of the vehicle results in a turning of the other truck in the opposite direction. As shown in FIG. 2, the arms 111 are connected to rods 114, which serve to operate control valves 115. The valves 115 are, in this case, connected in series in an equalizing line 116, 117, 118, which corresponds to the line 40, 44, 43 of FIG. 1. It is evident that, in this case too, a parallel connection of the two valves 115 is possible.

The supplementary means 20, 25, 34 and 37, of FIG. 1, can also be used in the present case.

Referring to FIG. 3, a vehicle frame 201 is mounted on the trucks 202, 203 which are able to turn about journals 204, 205. The trucks 202, 203 are provided with arms 206 directed toward the middle of the vehicle, which are acted on, over articulations 207, by piston-rods 208 associated with pistons 210 in cylinders 211 of hydraulic piston means. The cylinder chambers of the double-acting hydraulic cylinders 211, as already described, are connected by connecting lines 213, 214. As with the example of FIG. 1, each of the lines 213 and 214 is connected to a pressure-maintaining means 215, a pressure limiting means 216 and a heat-eqalizing element 217.

As shown further in FIG. 3, one of the arms 206 is connected to a rod 220, to which is fastened the housing 221 of a hydraulic control slide. This housing 221 has a slide piston 222 which is connected by a rod 223 to a lever arm 224 of a connecting shaft 225. A second arm 226 of the connecting shaft 225 is connected by a rod 227 to the arm 206 of the truck 203.

A hydraulic pressure-storage tank 229 is connected over a supply line 228 to the housing 221 of the control slide. The slide piston 222 serves to control the supply of hydraulic pressure medium, from the supply line 228, in the case concerned, into one of the connecting lines 213, 214. At the same time, the slide piston 222 controls the outflow of hydraulic pressure medium from the other connecting line through an outflow line 232 or 233, with a one-way valve 234, into a reservoir tank 235.

In order to provide the hydraulic pressure-storage tank 229 with hydraulic medium, pumps are provided which are driven by the turning movements of the trucks 202, 203, about the journals 204, 205. For this purpose, the hydraulic cylinders 211, 212, are provided with pump cylinders 236, in which pistons 237 are able to move. The pistons 237 are at the same time fastened to the pistons 210 on their piston-rods 208. The pump cylinders 236 are, by a common suction line 238 having suction valves 239, connected with the tank 235. A pressure line 240 having pressure valves 241 runs from the cylinders 236 to the supply line 228 and a pressure storage tank 229, respectively.

With the form of construction of FIG. 3, a turning movement of the truck 202 moves the slide case 221; and a turning movement of the truck 203 moves the slide element 222. When both turning movements are symmetrical relative to a transverse axis Z of the railroad vehicle, i.e. when both angles are of equal magnitude, then the relative position of the slide case 221 and of the slide piston 22 remains unaltered. Under normal conditions as shown in FIG. 3, no hydraulic medium is fed into the connecting lines 213, 214. However, as soon as nonsymmetry of the turning movements of the trucks 202, 203 relative to the transverse axis Z occurs, for example, through a leakage of hydraulic medium from one of the connecting lines, then movement of the slide pistons 222 occurs relative to the housing 221. The arrangement is such that by opening the way for a supply of hydraulic medium out of the supply line 228 into one of the connecting lines 213, 214, with a simultaneous opening of an outflow from the other connecting line into the tank 235, a correction of the angular positions of the trucks 202, 203 is produced toward a symmetrical setting.

The arrangement of FIG. 3 thus not only comprises a rigid connection between the two trucks, but in addition a control which ensures perfect operation of the cross-coupling.

The pump which is operated by movements of the truck 202, 203 has the advantage that no motor drive is needed. It is however understood that, for example, in the case of locomotives where various supplementary drives are available, the pump to supply the hydraulic equipment of the cross-coupling could also have a motor drive.

What is claimed is:

1. In combination with a rail vehicle frame having at least two trucks pivotally mounted thereon about respective vertical axes, a cross-coupling including a pair of hydraulic cylinder means mounted on said vehicle frame, each said means being connected to a respective truck for pivoting said respective truck about a respective one of said vertical axes relative to said rail vehicle frame, and a pair of connecting conduits hydraulically connected between said cylinder means for synchronizing said cylinder means to pivot said trucks in opposite directions in response to pivoting of at least one of said trucks.

2. The combination as set forth in claim 1 wherein said cross-coupling includes an elastic pressure-maintaining means in each of said connecting conduits for preventing a lowering of the pressure in said conduits below a given minimum value.

3. The combination as set forth in claim 1 wherein said cross-coupling includes a pressure-limiting means in each of said connecting conduits for limiting the maximum pressure in said conduits.

4. The combination as set forth in claim 1 wherein said cross-coupling includes a pressure medium replenishing means connected in common to said connecting conduits.

5. The combination as set forth in claim 1 wherein said cross-coupling includes a temperature compensating means in each connecting conduit to prevent pressure differences due to temperature changes.

6. In combination with a rail vehicle frame having three trucks pivotally mounted thereon about respective vertical axes longitudinally of said frame, a cross-coupling including a pair of hydraulic cylinder means mounted on the middle of one of said trucks, each said means being connected to a respective truck for pivoting said respective truck about a respective one of said vertical axes relative to said rail vehicle frame, and a pair of connecting conduits hydraulically connected between said cylinder means for synchronizing said cylinder means to pivot said trucks in opposite directions in response to pivoting of at least one of said trucks.

7. In combination with a rail vehicle frame having at least two trucks pivotally mounted thereon about respective vertical axes, a cross-coupling including a pair of hydraulic cylinder means, each said means being connected to a respective truck for pivoting said respective truck about a respective one of said vertical axes relative to said rail vehicle frame, and a pair of connecting conduits hydraulically connected between said cylinder means for synchronizing said cylinder means to pivot said trucks in opposite directions in response to pivoting of at least one of said trucks, and wherein each said cylinder means includes a double-acting hydraulic cylinder and a piston dividing said cylinder into two chambers and wherein said conduits are connected to said chambers.

8. In combination with a rail vehicle frame having at least two trucks pivotally mounted thereon about respective vertical axes, a cross-coupling including a pair of hydraulic cylinder means, each said means being connected to a respective truck for pivoting said respective truck about a respective one of said vertical axes relative to said rail vehicle frame, and a pair of connecting conduits hydraulically connected between said cylinder means for synchronizing said cylinder means to pivot said trucks in opposite directions in response to pivoting of at least one of said trucks, and wherein said cross-coupling further includes at least one equalizing conduit connected to said connecting conduits to equalize the pressures therein and a hydraulic control valve in said equalizing conduit for disconnecting said connecting conduits from each other via said equalizing conduit.

9. The combination as set forth in claim 8 wherein said control valve is connected to at least one said truck to disconnect said connecting conduits from each other in response to a predetermined pivoting of said one truck.

10. The combination as set forth in claim 8 wherein two said equalizing conduits are connected between said connecting conduits in parallel and wherein one said hydraulic control valve is disposed in each equalizing conduit and connected to one truck.

11. The combination as set forth in claim 8 wherein two said hydraulic control valves are connected in series in said equalizing line, each valve being connected to a respective one of said trucks.

12. In combination with a rail vehicle frame having at least two trucks pivotally mounted thereon about respective vertical axes, a cross-coupling including a pair of hydraulic cylinder means, each said means being connected to a respective truck for pivoting said respective truck about a respective one of said vertical axes relative to said rail vehicle frame, and a pair of connecting conduits hydraulically connected between said cylinder means for synchronizing said cylinder means to pivot said trucks in opposite directions in response to pivoting of at least one of said trucks, and wherein said cross-coupling includes a pressurized source of hydraulic medium, a reservoir tank, and a means for selectively connecting said source to one of said connecting conduits and said tank to the other of said connecting conduits, said latter means including a control valve coupled to said trucks for responding to a deviation of one of said trucks from a symmetrical angular position relative to a transverse axis of said vehicle frame to communicate said source with one of said connecting conduits and to simultaneously communicate the other of said connecting conduits with said reservoir tank and thereby produce a correction of the deviation in a direction toward said symmetrical position.

13. The combination as set forth in claim 12 wherein said control valve includes a housing connected to one truck and a piston slidably mounted in said housing and connected to the other of said trucks.

14. The combination as set forth in claim 12 wherein said source of hydraulic medium is a pressure storage tank having a supply of hydraulic medium therein.

15. The combination as set forth in claim 14 wherein said cross-coupling includes a hydraulic piston pump connected to one of said trucks and said storage tank for pump of hydraulic medium into said storage tank in response to pivoting of said truck relative to said vehicle frame.

16. The combination as set forth in claim 15 wherein one said hydraulic cylinder means includes a connecting rod connected to said truck for movement therewith and said pump has a piston mounted on said connecting rod for movement therewith.

* * * * *